United States Patent
Gilmartin et al.

(10) Patent No.: US 8,676,971 B2
(45) Date of Patent: *Mar. 18, 2014

(54) METHOD, SYSTEM AND COMPUTER PROGRAM PRODUCT FOR PROVIDING ETHERNET VLAN CAPACITY REQUIREMENT ESTIMATION

(75) Inventors: Neil Gilmartin, Atlanta, GA (US); Steven Allan Wright, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 78 days.

This patent is subject to a terminal disclaimer.

(21) Appl. No.: 13/493,077

(22) Filed: Jun. 11, 2012

(65) Prior Publication Data

US 2012/0250693 A1 Oct. 4, 2012

Related U.S. Application Data

(63) Continuation of application No. 12/604,750, filed on Oct. 23, 2009, now Pat. No. 8,219,696, which is a continuation of application No. 10/667,009, filed on Sep. 19, 2003, now Pat. No. 7,624,187.

(51) Int. Cl.
*G06F 15/173* (2006.01)

(52) U.S. Cl.
USPC ............ 709/224; 709/223; 709/225; 709/226

(58) Field of Classification Search
USPC .................................................. 709/223–226
See application file for complete search history.

(56) References Cited

U.S. PATENT DOCUMENTS

| | | | |
|---|---|---|---|
| 4,926,418 A | 5/1990 | Cidon et al. | |
| 5,216,591 A | 6/1993 | Nemirovsky et al. | |
| 5,684,800 A | 11/1997 | Dobbins et al. | |
| 5,774,876 A | 6/1998 | Woolley et al. | |
| 5,804,810 A | 9/1998 | Woolley et al. | |
| 5,825,772 A | 10/1998 | Dobbins et al. | |
| 5,867,494 A | 2/1999 | Krishnaswamy et al. | |
| 5,867,495 A | 2/1999 | Elliott et al. | |
| 5,892,441 A | 4/1999 | Woolley et al. | |
| 5,946,308 A | 8/1999 | Dobbins et al. | |

(Continued)

OTHER PUBLICATIONS

Martin, Richard P., et al. "Effects of Communication Latency, Overhead, and Bandwidth in a Cluster Architecture." University of California, Berkeley: Computer Science Division. International Symposium on Computer Architecture: pp. 85-97; 1997.

(Continued)

*Primary Examiner* — Hieu Hoang
(74) *Attorney, Agent, or Firm* — Cantor Colburn LLP

(57) ABSTRACT

A method, system, and computer program product for providing VLAN capacity requirement estimation is provided. The method includes receiving at a computing system a VLAN configuration file that specifies VLAN access ports, VLAN switches and VLAN trunks in a VLAN. A target access port identifier is received at the computing system from a requestor. A target trunk and target switch corresponding to the target access port are determined at the computing system. A bandwidth contribution of the target access port to the VLAN is calculated at the computing system. The calculating is based on a least contribution algorithm that reflects an impact of provisioning the target access port with respect to trunk capacity, and is responsive to the target bandwidth requirement, the target class of service and placement of the target port in the VLAN. The bandwidth contribution is then transmitted to the requestor.

20 Claims, 3 Drawing Sheets

(56) References Cited

U.S. PATENT DOCUMENTS

| | | |
|---|---|---|
| 5,949,788 A | 9/1999 | Friedman et al. |
| 5,959,568 A | 9/1999 | Woolley |
| 5,979,757 A | 11/1999 | Tracy et al. |
| 5,999,525 A | 12/1999 | Krishnaswamy et al. |
| 6,044,075 A | 3/2000 | Le Boudec et al. |
| 6,084,528 A | 7/2000 | Beach et al. |
| 6,092,113 A | 7/2000 | Maeshima et al. |
| 6,104,701 A | 8/2000 | Avargues et al. |
| 6,112,251 A | 8/2000 | Rijhsinghani |
| 6,147,995 A | 11/2000 | Dobbins et al. |
| 6,151,324 A | 11/2000 | Belser et al. |
| 6,199,753 B1 | 3/2001 | Tracy et al. |
| 6,208,649 B1 | 3/2001 | Kloth |
| 6,335,927 B1 | 1/2002 | Elliott et al. |
| 6,363,319 B1 | 3/2002 | Hsu |
| 6,522,641 B1 | 2/2003 | Siu et al. |
| 6,550,672 B1 | 4/2003 | Tracy et al. |
| 6,597,214 B1 | 7/2003 | Singh et al. |
| 6,631,019 B1 | 10/2003 | Vujkovic-Cvijin et al. |
| 6,633,573 B1 | 10/2003 | Ben-Zur et al. |
| 6,681,232 B1 | 1/2004 | Sistanizadeh et al. |
| 6,687,339 B2 | 2/2004 | Martin |
| 6,690,848 B2 | 2/2004 | Graves et al. |
| 6,697,793 B2 | 2/2004 | McGreevy |
| 6,721,728 B2 | 4/2004 | McGreevy |
| 6,731,625 B1 | 5/2004 | Eastep et al. |
| 6,731,832 B2 | 5/2004 | Alvarez et al. |
| 6,741,615 B1 | 5/2004 | Patwardhan et al. |
| 6,741,981 B2 | 5/2004 | McGreevy |
| 6,754,174 B1 | 6/2004 | Ben-Zur et al. |
| 6,754,181 B1 | 6/2004 | Elliott et al. |
| 6,763,025 B2 | 7/2004 | Leatherbury et al. |
| 6,778,498 B2 | 8/2004 | McDysan |
| 6,804,199 B1 | 10/2004 | Kelly et al. |
| 6,912,232 B1 | 6/2005 | Duffield et al. |
| 6,914,905 B1 | 7/2005 | Yip et al. |
| 6,963,575 B1 | 11/2005 | Sistanizadeh et al. |
| 6,976,087 B1 | 12/2005 | Westfall et al. |
| 7,028,083 B2 | 4/2006 | Levine |
| 7,092,389 B2 | 8/2006 | Chase et al. |
| 7,185,077 B1 | 2/2007 | O'Toole et al. |
| 7,446,891 B2 | 11/2008 | Haas et al. |
| 7,624,187 B1 | 11/2009 | Gilmartin et al. |
| 7,640,359 B1 | 12/2009 | Gilmartin |
| 2001/0003833 A1 | 6/2001 | Tomizawa et al. |
| 2002/0031142 A1 | 3/2002 | Metin et al. |
| 2002/0042274 A1 | 4/2002 | Ades |
| 2002/0054595 A1 | 5/2002 | Ambe et al. |
| 2002/0110087 A1 | 8/2002 | Zelig et al. |
| 2002/0120727 A1 | 8/2002 | Curley et al. |
| 2002/0126690 A1 | 9/2002 | Narayana et al. |
| 2002/0129727 A1 | 9/2002 | Ettmueller |
| 2002/0191250 A1 | 12/2002 | Graves et al. |
| 2003/0067928 A1 | 4/2003 | Gonda |
| 2003/0149788 A1 | 8/2003 | Saint Etienne et al. |
| 2003/0169694 A1 | 9/2003 | Seaman |
| 2003/0172188 A1 | 9/2003 | Hasegawa et al. |
| 2004/0042416 A1 | 3/2004 | Ngo et al. |
| 2004/0058652 A1 | 3/2004 | McGregor et al. |
| 2004/0062198 A1 | 4/2004 | Pedersen et al. |
| 2004/0081180 A1 | 4/2004 | De Silva et al. |
| 2004/0098500 A1 | 5/2004 | Liu et al. |
| 2004/0103282 A1 | 5/2004 | Meier et al. |
| 2004/0105459 A1 | 6/2004 | Mannam |
| 2004/0146006 A1 | 7/2004 | Jackson |
| 2004/0196790 A1 | 10/2004 | Balakrishnan et al. |
| 2004/0210623 A1 | 10/2004 | Hydrie et al. |
| 2004/0221042 A1 | 11/2004 | Meier |
| 2004/0246976 A1 | 12/2004 | Balakrishnan et al. |
| 2004/0249916 A1 | 12/2004 | Graves et al. |
| 2005/0021766 A1 | 1/2005 | McKeowen et al. |
| 2005/0027851 A1 | 2/2005 | McKeown et al. |
| 2005/0066036 A1 | 3/2005 | Gilmartin |
| 2005/0122983 A1 | 6/2005 | Gilmartin et al. |
| 2006/0013231 A1 | 1/2006 | Matthews et al. |
| 2006/0062211 A1 | 3/2006 | Manthoulis et al. |
| 2010/0046397 A1 | 2/2010 | Gilmartin |
| 2010/0046525 A1 | 2/2010 | Gilmartin et al. |

OTHER PUBLICATIONS

Kruse, James and Keith Ross, "Cross Networking, A Top-Down Approach Featuring the Internet", 2001, Addison Wesley Longman; Inc. pp. 280-281.

IEEE Standards for Local and Metropolitan Area Networks: Virtual Bridge Local Area Networks, LAN MAN Standards Committee of the IEEE Computer Society, Dec. 8, 1998, 34p, IEEE Std 802.1q-1998, The Institute of Electrical and Electronics Engineers, New York, New York, United States of America.

Fineburg, Victoria. "A Practical Architecture for Implementing End-to-End QoS in an IP Network." IEEE Communications Magazine: pp. 122-130. Jan. 2002.

METHOD, SYSTEM AND COMPUTER PROGRAM PRODUCT FOR PROVIDING ETHERNET VLAN CAPACITY REQUIREMENT ESTIMATION

CROSS-REFERENCE TO RELATED APPLICATIONS

This application is a continuation of U.S. patent application Ser. No. 12/604,750 filed Oct. 23, 2009, the contents of which are incorporated herein by reference in their entirety, which is a continuation of U.S. patent application Ser. No. 10/667,009 filed Sep. 19, 2003, the contents of which are incorporated herein by reference in their entirety.

FIELD OF THE INVENTION

The present disclosure relates generally to providing Ethernet VLAN capacity requirement estimation and in particular, to a method of utilizing a least contribution capacity algorithm for providing Ethernet VLAN capacity requirement estimation.

BACKGROUND OF THE INVENTION

Computer networks carry data between various devices. The data may be carried in connection-based links, such as the virtual circuits in an asynchronous transfer mode (ATM) network. Data may also be carried between devices in network segments where data is broadcast to all of a plurality of devices on the segment via a broadcast-type medium. An example of the latter is an Ethernet network. It is typically convenient to set up local area networks (LANs) using a broadcast type medium over which devices can share data.

In some circumstances, for example, where a LAN is required to connect devices that are geographically distant from one another, the LAN may be broken into separate segments. Within each segment devices (e.g., switches) can exchange data by way of a broadcast-type medium. The segments may be connected to one another by way of connection-based links such as physical transport lines. Such a LAN may be referred to as a virtual LAN (VLAN). The VLAN may be thought of as a logical web of connections over physical transports.

Metro-Ethernet networks are based on VLANs within the Ethernet network of a given metropolitan area. A VLAN is the interconnection of any number of access ports for a given customer within the larger service provider Ethernet network. Due to the nature of Ethernet VLANs as tree structures topologically, the calculation of the impact of any given port on the bandwidth (BW) of the underlying trunk network is complex since it depends not only on the BW of the port and the class of service (COS) of the VLAN, but also on the placement of the port within the context of the overall VLAN. Currently, expert technicians manage Ethernet VLANs manually. As VLANs become larger and include more complex (e.g., more COSs) it becomes more difficult and time consuming for technicians to take into account capacity considerations.

BRIEF DESCRIPTION OF THE INVENTION

An exemplary embodiment is a computer implemented method for providing virtual local area network (VLAN) capacity requirement estimation. The method includes receiving at a computing system a VLAN configuration file that specifies VLAN access ports, VLAN switches and VLAN trunks in a VLAN. A target access port identifier is received at the computing system from a requestor, the target access port identifier includes a target class of service and a target bandwidth requirement. A target trunk and target switch corresponding to the target access port are determined at the computing system. The target trunk corresponds to one of the VLAN trunks and the target switch corresponds to one of the VLAN switches. A bandwidth contribution of the target access port to the VLAN is calculated at the computing system. The calculating is based on a least contribution algorithm that reflects an impact of provisioning the target access port with respect to trunk capacity, and is responsive to the target bandwidth requirement, the target class of service and placement of the target port in the VLAN. The bandwidth contribution is then transmitted to the requestor.

Another exemplary embodiment is a system for providing VLAN capacity requirement estimation. The system includes a storage device storing a VLAN configuration database specifying VLAN access ports, VLAN switches and VLAN trunks in a VLAN. The system also includes a host system in communication with the storage device and in communication with a user system via a network. The host system includes application software to implement a method. The method includes receiving a VLAN configuration file that specifies VLAN access ports, VLAN switches and VLAN trunks in a VLAN. A target access port identifier is received from a requestor, the target access port identifier includes a target class of service and a target bandwidth requirement. A target trunk and target switch corresponding to the target access port are determined. The target trunk corresponds to one of the VLAN trunks and the target switch corresponds to one of the VLAN switches. A bandwidth contribution of the target access port to the VLAN is calculated. The calculating is based on a least contribution algorithm that reflects an impact of provisioning the target access port with respect to trunk capacity, and is responsive to the target bandwidth requirement, the target class of service and placement of the target port in the VLAN. The bandwidth contribution is then transmitted to the requestor.

Still further embodiments of the present invention include a computer program product for providing VLAN capacity requirement estimation. The computer program product includes a tangible storage medium readable by a processing circuit and stores instructions for execution by the processing circuit for facilitating a method that includes receiving a VLAN configuration file that specifies VLAN access ports, VLAN switches and VLAN trunks in a VLAN. A target access port identifier is received from a requestor, the target access port identifier includes a target class of service and a target bandwidth requirement. A target trunk and target switch corresponding to the target access port are determined. The target trunk corresponds to one of the VLAN trunks and the target switch corresponds to one of the VLAN switches. A bandwidth contribution of the target access port to the VLAN is calculated. The calculating is based on a least contribution algorithm that reflects an impact of provisioning the target access port with respect to trunk capacity, and is responsive to the target bandwidth requirement, the target class of service and placement of the target port in the VLAN. The bandwidth contribution is then transmitted to the requestor.

Other systems, methods and/or computer program products according to embodiments will be or become apparent to one with skill in the art upon review of the following drawings and detailed description. It is intended that all such additional systems, methods, and/or computer program products be within the scope of the present invention, and be protected by the accompanying claims.

BRIEF DESCRIPTION OF THE DRAWINGS

Referring to the exemplary drawings wherein like elements are numbered alike in the several FIGURES.

DETAILED DESCRIPTION OF THE INVENTION

Exemplary embodiments of the present invention implement a least contribution algorithm for calculating the impact of any given port on the BW of the underlying trunk network, on a per port basis, in the context of provisioning VLANs. Provisioning decisions are made based on the result of applying the least contribution algorithm and counters are updated and/or alerts are generated. Exemplary embodiments of the present invention will calculate the impact of the addition (or removal) of a particular access port to a specified VLAN. Exemplary embodiments of the present invention may be utilized to provide an audit function of a VLAN by walking through each access port in the specified VLAN. For every existing link in the specified VLAN, appropriate alerts may be generated, counters updated and a pass or fail status communicated.

Exemplary embodiments of the present invention operate in the context of an operational support system that manages metro-Ethernet services. The operational support system may provide the context of network intelligence and capacity tracking counters and control parameter that govern the logic of the least contribution capacity algorithm. In exemplary embodiments of the present invention, the operational support system includes a database of existing VLANs such that the VLAN names are unique across the region, each existing VLAN has an accessible list of network elements already in the connection paths of that VLAN, and each VLAN has the counters to support a least contribution algorithm. In addition, each trunk includes capacity counters and threshold parameters that contain: the BW capacity of the trunk; the currently assigned BW in each COS category; and alarm and cutoff parameters that may be utilized by exemplary embodiments of the present invention to control further assignments to that trunk.

In exemplary embodiments of the present invention, the algorithm has as input a VLAN name, a COS, an access port and the BW of the port. The algorithm then examines every link relative to this access port, i.e., every link has a near end and a far end relative to this access port. Due to the tree structure of an Ethernet VLAN, all ports in the VLAN are on exactly one side or the other of each link. The algorithm can therefore be utilized to calculate the sum of all ports on each of the two sides of the link, or trunk, and then determine the overall impact of adding the access port. Taking the BW and COS of the port into account and the contribution of the port to the capacity load of the link, the algorithm verifies whether capacity is available for the port. If yes, it adjusts the counters appropriately and goes on to the next link. The least contribution algorithm may be utilized by exemplary embodiments of the present invention in the VLAN provisioning process to determine the impact on the existing VLAN link of adding (or removing) an access port on the VLAN. It will pass or fail the assignment and issue appropriate alarms.

Figure 1:
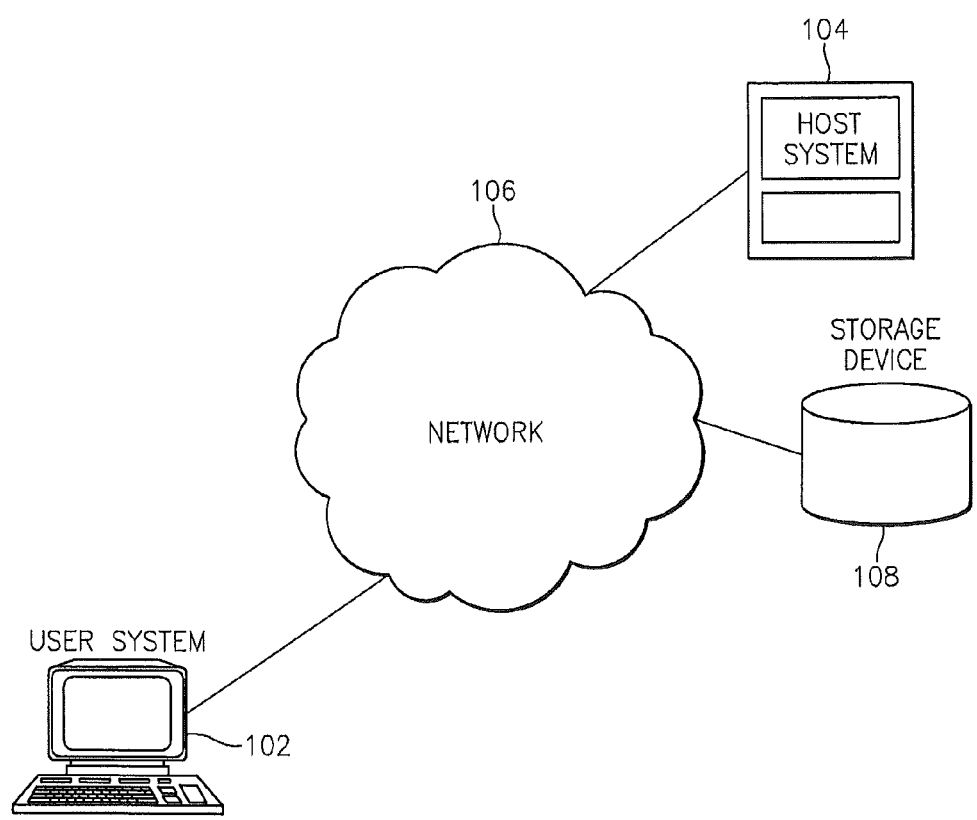
FIG. 1 is a block diagram of an exemplary system for providing Ethernet VLAN capacity requirement estimation in accordance with exemplary embodiments of the present invention.

FIG. 1 is a block diagram of an exemplary system for providing Ethernet VLAN capacity requirement estimation in accordance with exemplary embodiments of the present invention. The exemplary system includes a host system 104 for executing a least contribution algorithm and for setting counters and alarms. The system in FIG. 1 also includes one or more user systems 102 through which VLAN technicians located at one or more geographic locations may contact the host system 104 to initiate the execution of the Ethernet VLAN capacity requirement estimation application. The Ethernet VLAN capacity requirement estimation application includes calculating a least contribution algorithm, updating counters associated with the VLAN and transmitting alerts based on specified conditions. In exemplary embodiments of the present invention, the host system 104 executes the capacity requirement estimation application and the user system 102 is coupled to the host system 104 via a network 106. In alternate exemplary embodiments, the user system 102 is directly connected to the host system 104. Each user system 102 may be implemented using a general-purpose computer executing a computer program for carrying out the processes described herein. The user system 102 may be a personal computer (e.g., a lap top, a personal digital assistant) or a host attached terminal. If the user system 102 is a personal computer, the processing described herein may be shared by a user system 102 and the host system 104 (e.g., by providing an applet to the user system 102).

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and LAN) so that not all user systems 102 are coupled to the host system 104 through the same network. One or more of the user systems 102 and the host system 104 may be connected to the network 106 in a wireless fashion.

The storage device 108 depicted in FIG. 1 may be implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. The physical data may be located in a variety of geographic locations depending on application and access requirements. Information stored in the storage device 108 may be retrieved and manipulated via the host system 104. The storage device 108 includes interim data utilized to perform the Ethernet VLAN capacity requirement estimation. In addition, the storage device 108 includes access to operational system support data such as a database of network elements and trunks, a database of existing VLANs and the network elements associated with the VLANs, and capacity data (e.g., counters for each COS) for the trunks and switches. The storage device 108 may also include other kinds of data such as information concerning the creation and update of the VLANs (e.g., date, time of creation/update and technician identification). In exemplary embodiments of the present invention, the host system 104 operates as a database server and coordinates access to application data including data stored on storage device 108. Access to data contained storage device 108 may be restricted based on user characteristics.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may reside behind a firewall to prevent unauthorized access to the host system 104 and enforce any limitations on authorized access. A firewall may be implemented using conventional hardware and/or software as is known in the art.

The host system 104 may also operate as an application server. The host system 104 executes one or more computer programs to provide Ethernet VLAN capacity requirement estimation. One or more application programs within the host system 104 share information to support the capacity requirement estimation process. The processing of the capacity requirement estimation application may be shared by a user system 102 and the host system 104 by providing an application (e.g., a Java applet) to the user system 102. As previously described, it is understood that separate servers may be utilized to implement the network server functions and the application server functions. Alternatively, the network server, the firewall, and the application server may be implemented by a single server executing computer programs to perform the requisite functions.

Figure 2:
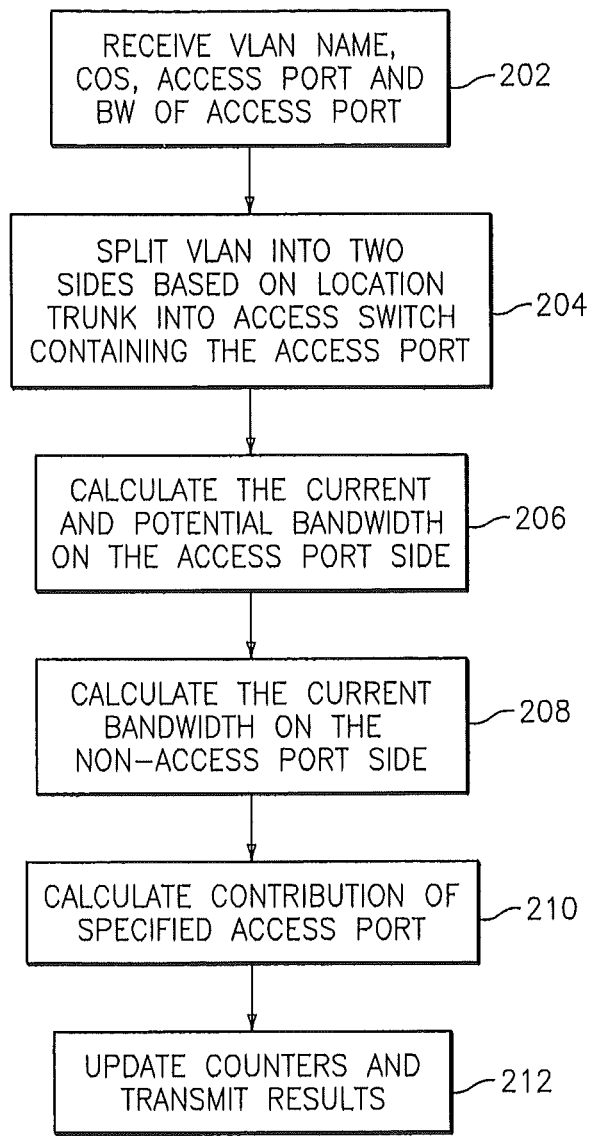
FIG. 2 is a flow diagram of an exemplary process for providing Ethernet VLAN capacity requirement estimation in accordance with exemplary embodiments of the present invention.

FIG. 2 is a flow diagram of an exemplary process for providing Ethernet VLAN capacity requirement estimation in accordance with exemplary embodiments of the present invention. At step 202, a VLAN name, COS, access port and the BW of the access port are received. Based on this input data, the VLAN data including the access ports, access switches, trunks and trunk counters are retrieved from an operational support system. At step 204, the VLAN is split into two sides based on the location of the trunk into the access switch containing the input access port. Exemplary embodiments of the present invention consider all trunks in the VLAN as having an "access port side" (the side closest to the access port being considered) and a "non-access port side" (the side farthest from this port being considered).

At step 206, the current and potential BW associated with the access port side is calculated. The current access port side total is the sum of all BW requirements entering the trunk from the switch at the access port side of the trunk. The potential access port side total is the sum of the current access port side total and the BW of the specified access port. Next, at step 208, the current BW associated with the non-access port side of the trunk is calculated as the total of the BW of all access ports on the non-access port side of the trunk. At step 210, the contribution of the specified access port is calculated in terms of a minimum required BW. The current minimum required BW may be calculated as the minimum of the current access port side total and the current non-access port side total. The potential minimum required BW may be calculated as the minimum of the potential access port side total and the current non-access port side total. The BW contribution of the specified access port is equal to the potential minimum required BW minus the current minimum required BW. The BW contribution of the specified access port is zero if the current minimum required BW is equal to the potential minimum required BW.

At step 212, the algorithm checks the capacity of the trunk to verify that the requested BW, or the BW contribution of the specified access port, for the requested COS is available. A pair of access switches may include several trunks between them to choose from for the requested BW. In exemplary embodiments of the present invention, the trunk that currently contains the highest utilization is selected by the algorithm as long as the selection does not cause the trunk to exceed capacity. Alternate exemplary embodiments may allow a technician to select the trunk that has the lowest utilization. If the assignment of the requested BW would cross the alarm, or alert, threshold for the specified COS on the trunk, an alarm is raised. If the assignment would cross the cutoff threshold for the specified COS on the trunk, an alarm is raised and the assignment is not allowed. Alarms, or alerts, may include sending an e-mail to alert an individual of the situation and/or sending the data to an operational system. The algorithm updates the capacity counters of each trunk and VLAN trunk as appropriate and returns an indication of whether the assignment is a pass or fail. If the assignment failed, then the links that have failed are also returned.

Alternate exemplary embodiments of the present invention may be utilized to perform audits on VLAN capacity to ensure that the required BW is being made available and to assess the likelihood of new trunks being required in the near future to support the VLAN. This may be performed by walking through each access port in the VLAN and assessing the capacity requirements. The audit may be utilized to verify that a VLAN that was designed manually includes enough capacity. Exemplary embodiments of the audit include: checking the hand designed VLAN for structural integrity (e.g., completeness, coherence, and tree structure); computing all capacity counters and hub values; and checking capacity on all trunks. Other alternate exemplary embodiments of the present invention may be utilized to update the VLAN and counters, if there is enough capacity, and to transmit any alerts and/or cut-off threshold data.

Figure 3:
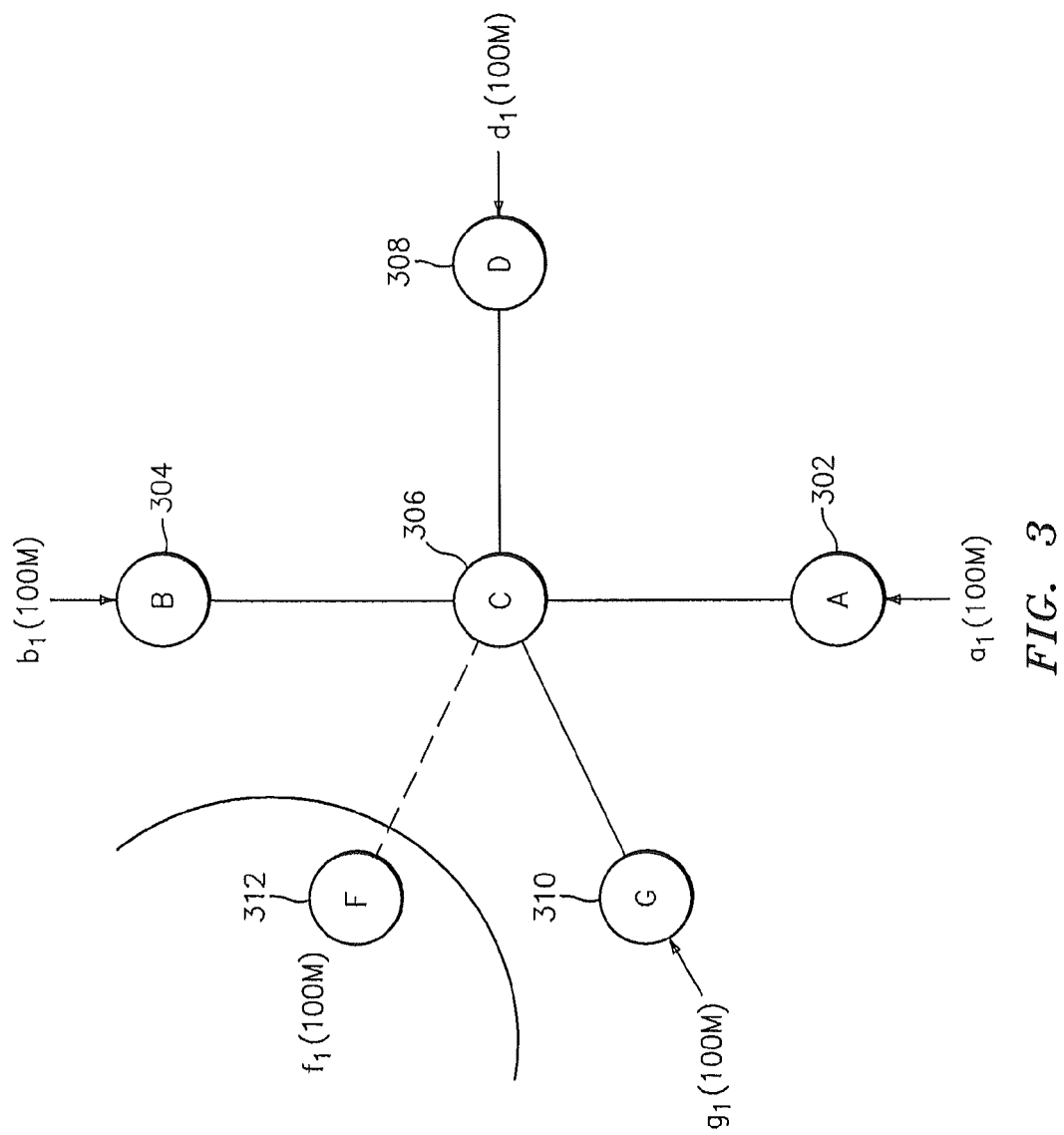
FIG. 3 is a block diagram of access switches and physical transport lines that may be utilized in exemplary embodiments of the present invention.

In the following example, the impact of an access port on the BW of an underlying trunk in a VLAN is calculated. The example is simplified to show how exemplary embodiments of the present invention may perform, however, a typical Ethernet VLAN may include twenty or more access ports. FIG. 3 is a block diagram of access switches, access ports and physical transport lines, or trunks, that may be utilized in exemplary embodiments of the present invention. The block diagram includes access switch A 302 with an access port "a1" that has a 100 megabyte (M) bandwidth requirement, access switch B 304 with an access port "b1" that has a 100 M bandwidth requirement, switch C 306, access switch D 308 with an access port "d1" that has a 100 M bandwidth requirement, access switch G 310 with an access port "g1" that has a 100 M bandwidth requirement, and access switch F 312 with an access port "f1" that has a 100 M bandwidth requirement.

The impact of a 100 M access port f1 at access switch F 312 is being calculated. In this example, the following data is received from the requestor or from the operational support systems: COS is best effort; the trunk connecting access switch F 312 to switch C 306 has the capacity to support a BW of 1000 M for the best effort COS; the current BW is 750 M and an alert should be generated when the BW passes 800 M. The VLAN, as depicted in FIG. 3, is retrieved from the operational support system based on the VLAN name received as input. The VLAN is split into two sides based on the location of the trunk into the access switch containing the input access port f1 (see step 204 in FIG. 2). The access port side includes the access switch F 312 and the "non-access port side" includes access switch G 310, access switch A 302, access switch D 308, access switch B 304 and switch C 306.

Next, the current and potential BW associated with the access port side is calculated (see step 206 in FIG. 2):

Current access port side total=0(currently no BW required by the VLAN on switch F 312);

Potential access port side total=100M (100M from switch F 312).

Next, the current BW associated with the non-access port side of the trunk is calculated (see step 208 in FIG. 2):

Current non-access port side total=400 M (100M from switch B 304, 100M from switch D 308, 100M from switch A 302 and 100M from switch G 310 into switch C 306).

Then, the contribution of the specified access port is calculated in terms of a minimum required BW (see step 210 in FIG. 2):

Current minimum BW=MIN(0(current access port side total),400(current non-access port side total))=0;

Potential minimum BW=MIN(100(potential access port side total),400(current non-access port side total))=100;

Contribution of access port $f1$=100M(potential minimum BW)−0M (current minimum BW)=100M.

The algorithm then checks the capacity of the trunk to verify that the requested BW for the COS best effort is available (see step 212 in FIG. 2). The trunk currently has BW capacity of 1000M for the best effort COS and 750M is currently reserved. Therefore, there is room for the additional 100M which will bring the reserved level up to 850M, 50M over the alert condition. The algorithm will then send an alert (e.g., an e-mail) to notify the responsible party(s) of the condition. In addition, the algorithm will reserve the 100M on the trunk for connecting the access port f1.

Exemplary embodiments of the present invention assess the capacity requirements when an access port is added or removed from a VLAN. This may be performed prior to adding a new access port to ensure that enough capacity is available. In addition, exemplary embodiments of the present invention may be utilized to perform VLAN audits to determine if the trunks supporting a VLAN are reaching capacity limits. This ability to predict capacity impact and to audit a VLAN may lead to better VLAN performance because new trunk capacity may be added and/or the access port may be connected via a different trunk and thereby avoid performance degradation of the VLAN.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Exemplary embodiments of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer implemented method for providing virtual local area network capacity requirement estimation, the method comprising:

receiving at a computing system an identification of virtual local area network access ports, virtual local area network switches and virtual local area network trunks in a virtual local area network;

determining at the computing system a target trunk and a target switch corresponding to a target access port, wherein the target trunk corresponds to one of the virtual local area network trunks and the target switch corresponds to one of the virtual local area network switches;

calculating at the computing system a bandwidth contribution of the target access port to the virtual local area network, wherein calculating the bandwidth contribution of the target access port to the virtual local area network includes:

splitting the virtual local area network into two portions based on location of the virtual local area network switches relative to the target trunk, wherein one portion includes the target access port and is an access port side closest to the target access port and the other portion is a non-access port side farthest from the target access port;

calculating a current access port side bandwidth requirement responsive to the virtual local area network;

calculating a potential access port side bandwidth requirement responsive to the virtual local area network and to the target access port;

calculating a current non-access port side bandwidth requirement responsive to the virtual local area network; and determining the bandwidth contribution of the target access port by subtracting a minimum of the current access port side bandwidth requirement compared to the current non-access port side bandwidth requirement from the minimum of the potential access port side bandwidth requirement compared to the current non-access port side bandwidth requirement.

2. The method of claim 1, wherein a target capacity counter corresponds to the target trunk, and the method further comprises:

adding the bandwidth contribution to the target capacity counter corresponding to the target trunk resulting in a target capacity; and transmitting an alert in response to the target capacity exceeding a target threshold corresponding to the target trunk.

3. The method of claim 2, wherein the target threshold is an alarm threshold.

4. The method of claim 2, wherein the target threshold is a cut-off threshold.

5. The method of claim 2, further comprising updating the target capacity counter with the target capacity and adding the target access port to the virtual local area network in response to the target capacity not exceeding the target threshold.

6. The method of claim 2, wherein the target threshold varies based on a target class of service.

7. The method of claim 2, wherein the target capacity varies based on a target class of service.

8. The method of claim 7, wherein the target class of service is best effort.

9. The method of claim 7, wherein the target class of service is committed bandwidth.

10. The method of claim 7, wherein the target class of service is priority plus.

11. A system for providing virtual local area network capacity requirement estimation, the system comprising:
 a storage device storing a virtual local area network configuration database specifying virtual local area network access ports, virtual local area network switches and virtual local area network trunks in a virtual local area network;
 a host system in communication with the storage device and in communication with a user system via a network, the host system including application software to implement a method comprising:
 accessing the virtual local area network configuration database;
 determining a target trunk and a target switch corresponding to a target access port, wherein the target trunk corresponds to one of the virtual local area network trunks and the target switch corresponds to one of the virtual local area network switches in the virtual local area network;
 calculating a bandwidth contribution of the target access port to the virtual local area network,
 wherein calculating the bandwidth contribution of the target access port to the virtual local area network includes:
  splitting the virtual local area network into two portions based on location of the virtual local area network switches relative to the target trunk, wherein one portion includes the target access port and is an access port side closest to the target access port and the other portion is a non-access port side farthest from the target access port;
  calculating a current access port side bandwidth requirement responsive to the virtual local area network;
  calculating a potential access port side bandwidth requirement responsive to the virtual local area network and to the target access port;
  calculating a current non-access port side bandwidth requirement responsive to the virtual local area network; and
  determining the bandwidth contribution of the target access port by subtracting a minimum of the current access port side bandwidth requirement compared to the current non-access port side bandwidth requirement from the minimum of the potential access port side bandwidth requirement compared to the current non-access port side bandwidth requirement.

12. The system of claim 11, wherein a target capacity counter corresponds to the target trunk, and the method further comprises:
 adding the bandwidth contribution to the target capacity counter corresponding to the target trunk resulting in a target capacity; and
 transmitting an alert in response to the target capacity exceeding a target threshold corresponding to the target trunk.

13. The system of claim 12, further comprising updating the target capacity counter with the target capacity and adding the target access port to the virtual local area network in response to the target capacity not exceeding the target threshold.

14. The system of claim 12, wherein the target threshold varies based on a target class of service.

15. The system of claim 12, wherein the target capacity varies based on a target class of service.

16. The system of claim 12, wherein the network includes an intranet.

17. A computer program product for providing virtual local area network capacity requirement estimation, the computer program product comprising:
 a non-transitory, tangible storage medium readable by a processing circuit and storing instructions for execution by the processing circuit for facilitating a method comprising:
 receiving a virtual local area network configuration file specifying virtual local area network access ports, virtual local area network switches and virtual local area network trunks in a virtual local area network;
 determining a target trunk and a target switch corresponding to a target access port, wherein the target trunk corresponds to one of the virtual local area network trunks and the target switch corresponds to one of the virtual local area network switches in the virtual local area network;
 calculating a bandwidth contribution of the target access port to the virtual local area network,
 wherein calculating the bandwidth contribution of the target access port to the virtual local area network includes:
  splitting the virtual local area network into two portions based on location of the virtual local area network switches relative to the target trunk, wherein one portion includes the target access port and is an access port side closest to the target access port and the other portion is a non-access port side farthest from the target access port;
  calculating a current access port side bandwidth requirement responsive to the virtual local area network;
  calculating a potential access port side bandwidth requirement responsive to the virtual local area network and to the target access port;
  calculating a current non-access port side bandwidth requirement responsive to the virtual local area network; and
  determining the bandwidth contribution of the target access port by subtracting a minimum of the current access port side bandwidth requirement compared to the current non-access port side bandwidth requirement from the minimum of the potential access port side bandwidth requirement compared to the current non-access port side bandwidth requirement.

18. The computer program product of claim 17, wherein a target capacity counter corresponds to the target trunk, and the method further comprises:
 adding the bandwidth contribution to the target capacity counter corresponding to the target trunk resulting in a target capacity; and
 transmitting an alert in response to the target capacity exceeding a target threshold corresponding to the target trunk.

19. The computer program product of claim 18, further comprising updating the target capacity counter with the target capacity and adding the target access port to the virtual local area network in response to the target capacity not exceeding the target threshold.

20. The computer program product of claim 18, wherein the target threshold varies based on the target class of service and the target capacity varies based on the target class of service.

* * * * *